United States Patent [19]

Perantoni et al.

[11] Patent Number: 5,129,804
[45] Date of Patent: Jul. 14, 1992

[54] MOLD HAVING AN INSERT FOR MOLDING BATHTUBS

[75] Inventors: John C. Perantoni, Canfield; Ronald M. Marsilio, Mogadore, both of Ohio

[73] Assignee: American Standard Inc., New York, N.Y.

[21] Appl. No.: 458,598

[22] Filed: Dec. 29, 1989

[51] Int. Cl.[5] ............... B29C 45/14; B29C 33/44
[52] U.S. Cl. .................. 425/117; 425/129.1; 425/438; 425/442; 425/444; 425/556; 425/DIG. 58; 249/93; 249/172; 249/177
[58] Field of Search ............... 425/110, 117, 129.1, 425/543, 556, 577, 438, 442, 444, DIG. 58; 264/46.4, 46.6, 46.7, 275, 278; 249/63, 67, 68, 83, 84, 91, 93, 102, 124, 140, 145, 172, 176, 177, 184, 186

[56] References Cited

U.S. PATENT DOCUMENTS

| | | | |
|---|---|---|---|
| 2,400,024 | 5/1946 | Roehrl | 425/DIG. 58 |
| 2,514,886 | 7/1950 | McDearmon | 249/140 |
| 2,591,607 | 4/1952 | Rich | 249/101 |
| 2,820,228 | 1/1958 | Rodman | 428/357 |
| 2,871,619 | 2/1959 | Walters | 249/177 |
| 3,148,433 | 9/1964 | Carriker | 249/177 |
| 3,339,879 | 9/1967 | Gruber | 249/177 |
| 3,368,239 | 2/1968 | Wiltshire | 249/65 |
| 3,427,178 | 2/1969 | Zakim et al. | 249/115 |
| 3,610,563 | 10/1971 | Allen | 249/65 |
| 3,674,394 | 7/1972 | Wiltshire | 249/65 |
| 3,680,826 | 8/1972 | Bassani | 249/177 |
| 3,925,530 | 12/1975 | Rees | 249/115 |
| 4,053,545 | 10/1977 | Fay | 264/46.4 |
| 4,664,982 | 5/1987 | Genovese et al. | 428/447 |
| 4,844,944 | 7/1989 | Graefe et al. | 428/357 |
| 4,844,955 | 7/1989 | Graefe et al. | 428/420 |

FOREIGN PATENT DOCUMENTS

| | | |
|---|---|---|
| 0164822 | 12/1985 | European Pat. Off. . |
| 0261760 | 3/1988 | European Pat. Off. . |
| 1959566 | 9/1971 | Fed. Rep. of Germany . |
| 2951091 | 7/1981 | Fed. Rep. of Germany . |
| 3433661 | 3/1986 | Fed. Rep. of Germany . |
| 3713710 | 11/1987 | Fed. Rep. of Germany . |
| 1406950 | 6/1965 | France .............. 425/DIG. 58 |
| 606984 | 5/1978 | U.S.S.R. .................. 249/177 |
| 1036552 | 8/1983 | U.S.S.R. .................. 249/177 |
| 1158365 | 5/1985 | U.S.S.R. .................. 249/177 |
| 1158366 | 5/1985 | U.S.S.R. .................. 249/177 |
| 910699 | 8/1961 | United Kingdom ....... 425/DIG. 58 |

OTHER PUBLICATIONS

C2 3712959 Schock & Co.; Germany Patent Aug. 1989.

Primary Examiner—Jay H. Woo
Assistant Examiner—Khanh P. Nguyen
Attorney, Agent, or Firm—John P. Sinnott; Ann M. Knab

[57] ABSTRACT

A mold for making bathtubes is disclosed. The mold includes a mold receptor and an insert attached to the mold receptor face. The mold receptor receives a shell which has a finish side and a non-finish side. The shell is placed in the mold receptor leaving a void between the non-finish side of the shell and the face of the receptor. The insert is attached to the face of the mold receptor to reduce the cross-sectional area of a portion of the space between the shell and mold receptor face. A male mold engages the finish side of the shell, sealably retaining the shell to the mold receptor. A polymeric foam material is introduced into the void between the receptor and the shell. The polymeric material fills the void and coats the shell. The molded bathtub is then removed from the mold receptor after the male mold has been removed. The insert is then removed leaving an area of reduced thickness and a periphery on the non-finish side of the molded bathtub which defines a lip.

21 Claims, 18 Drawing Sheets

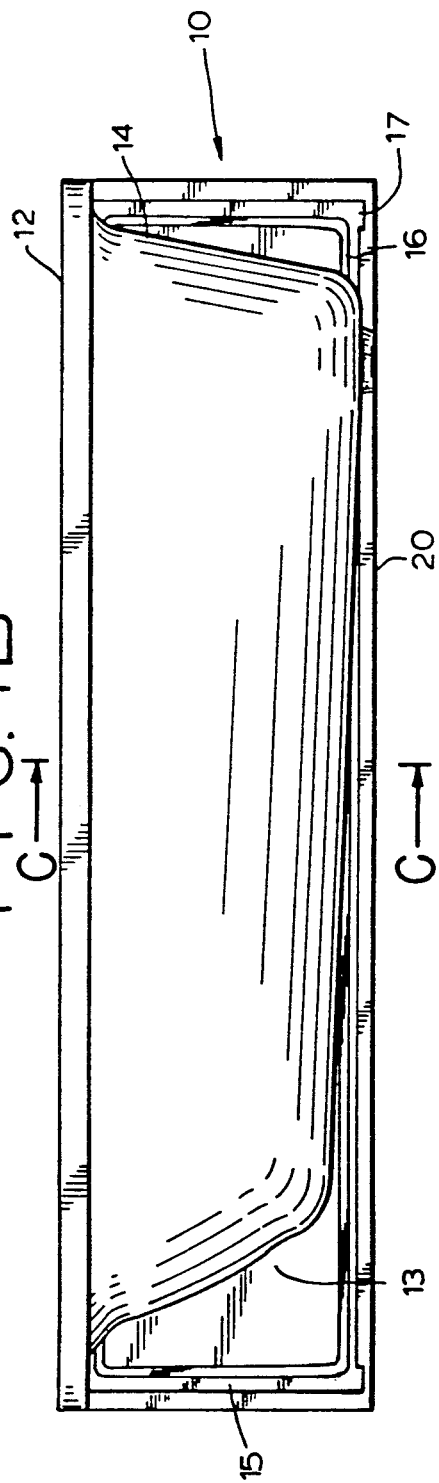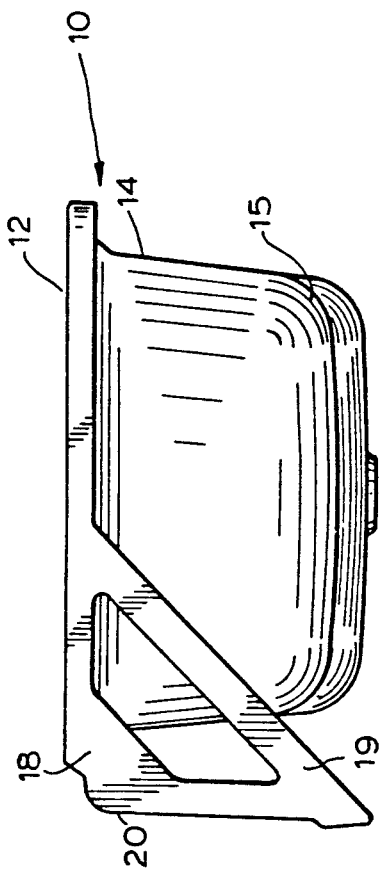

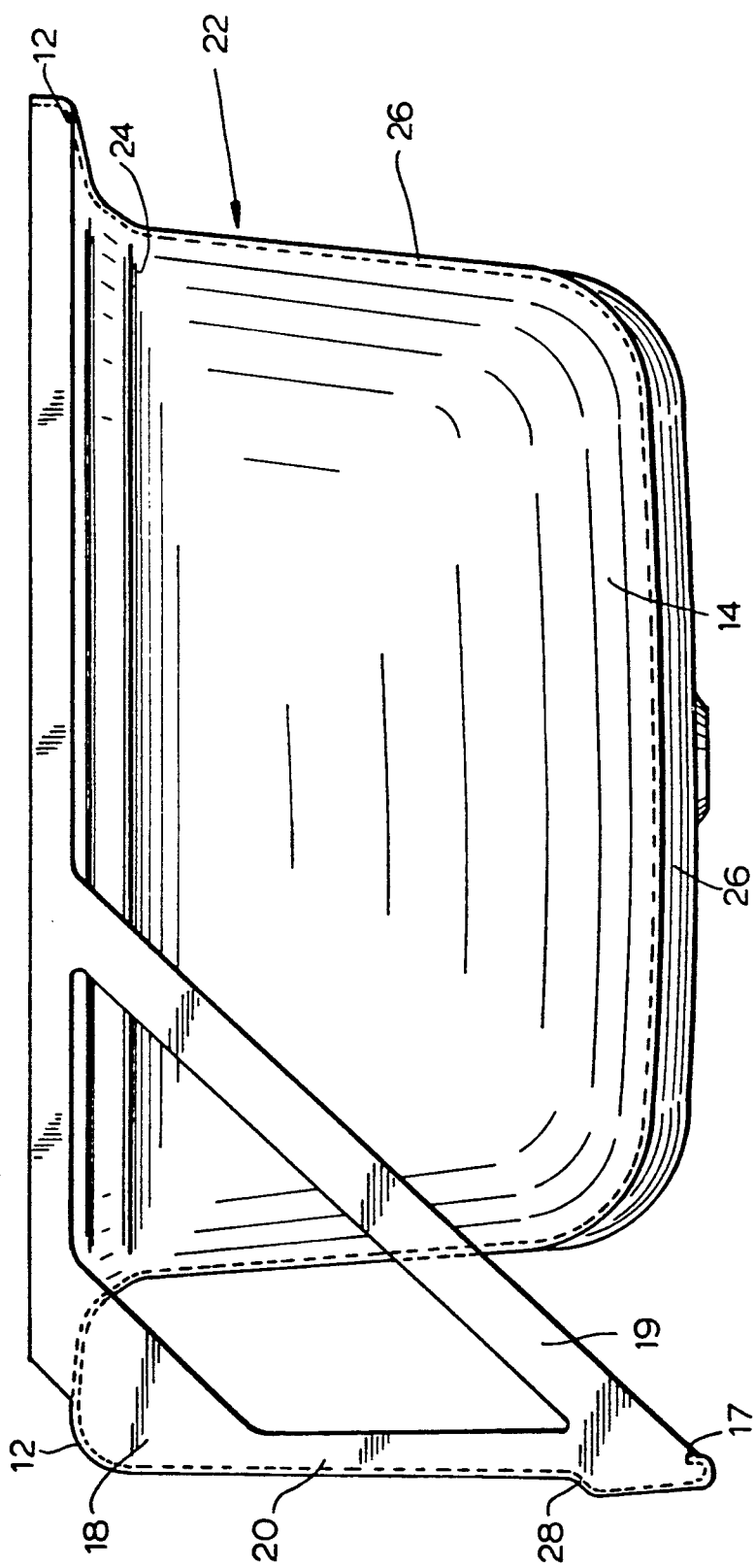

FIG. 3A
FIG. 3B
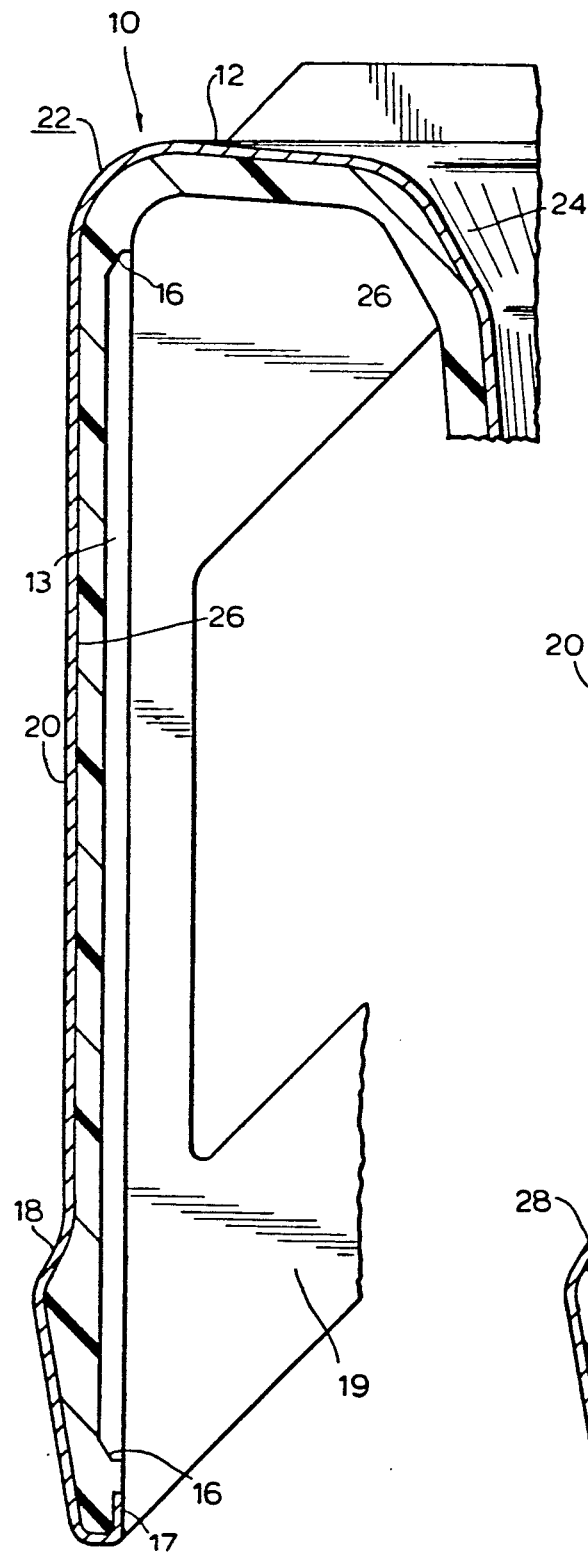
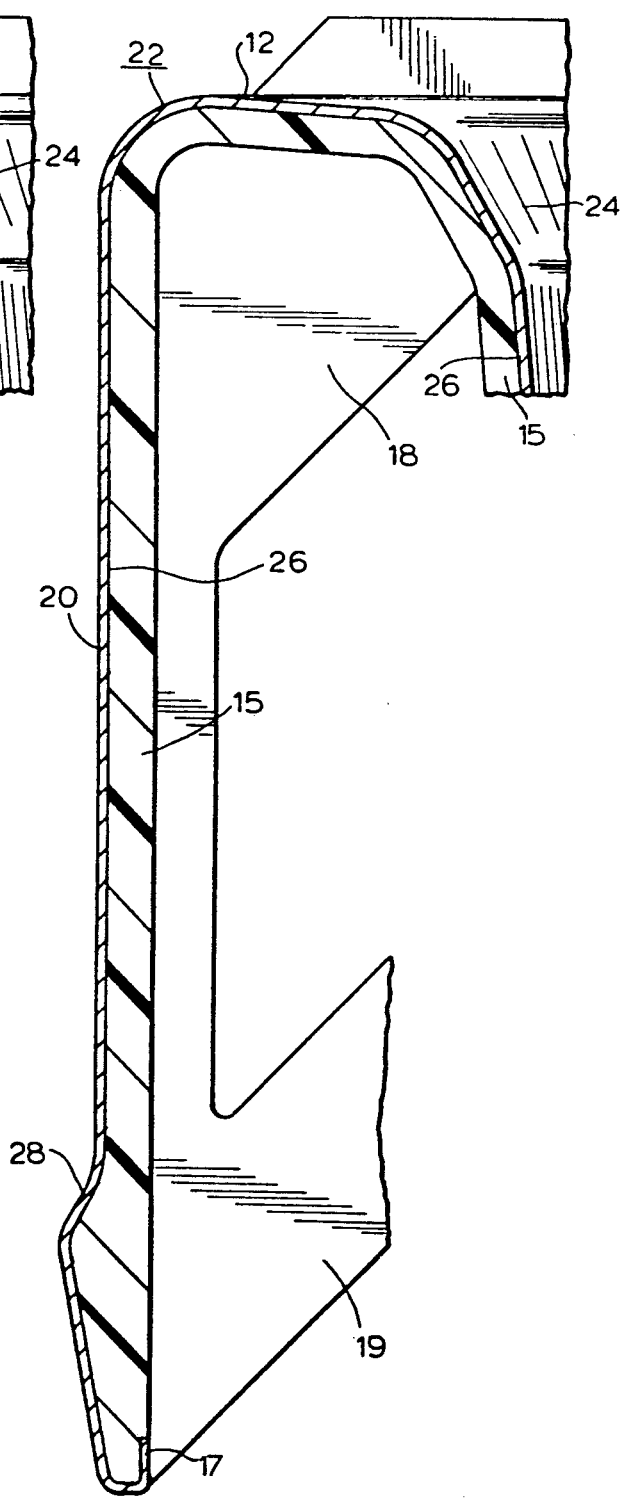

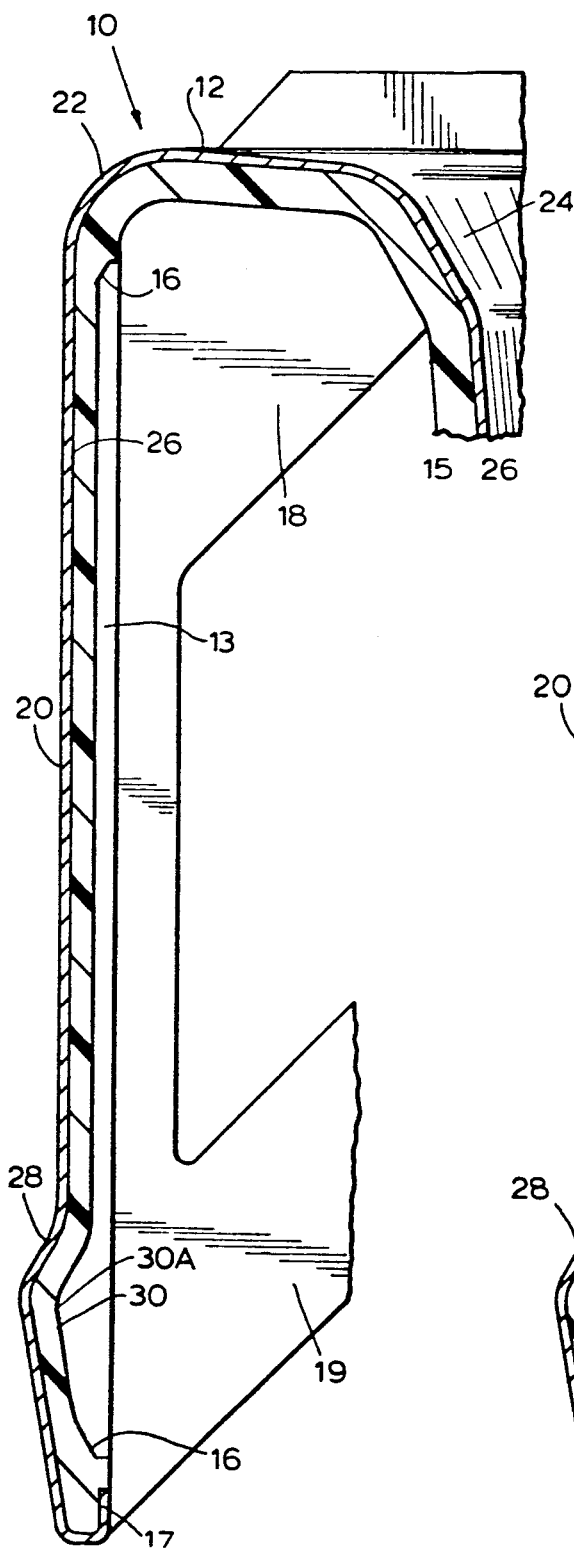
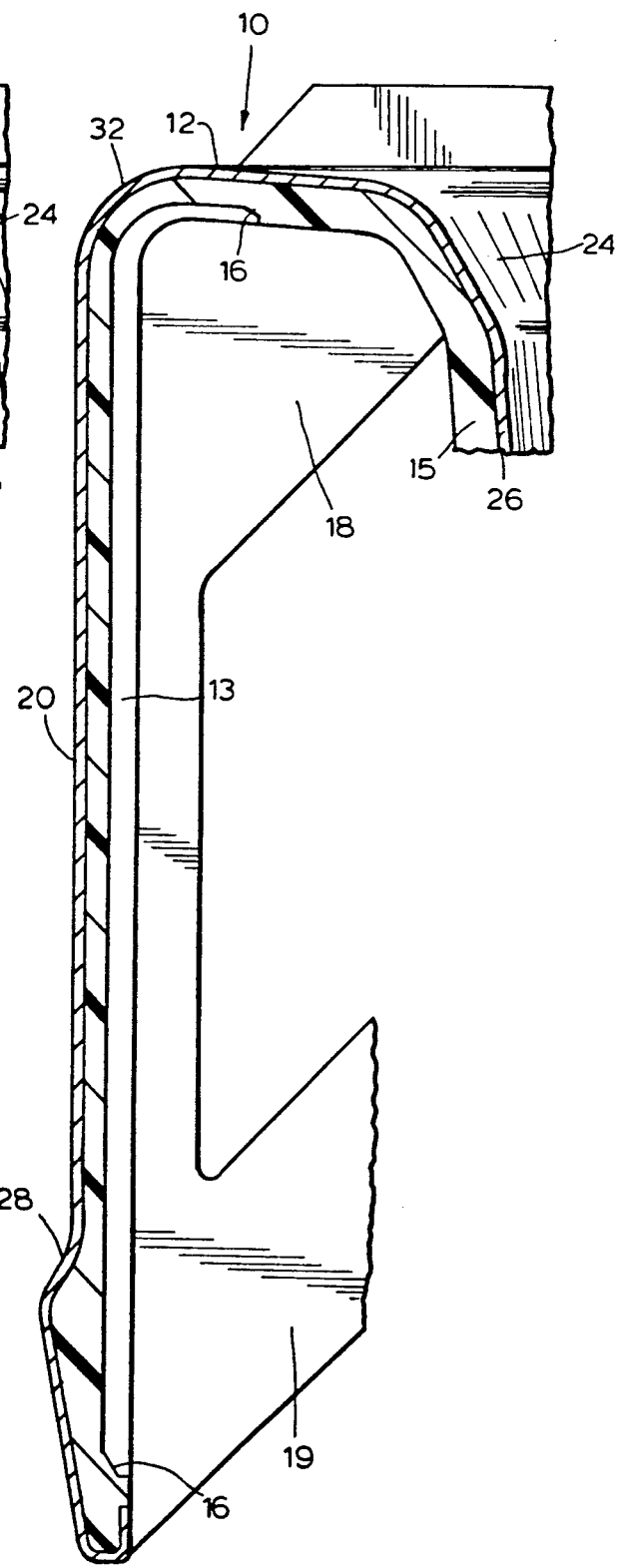

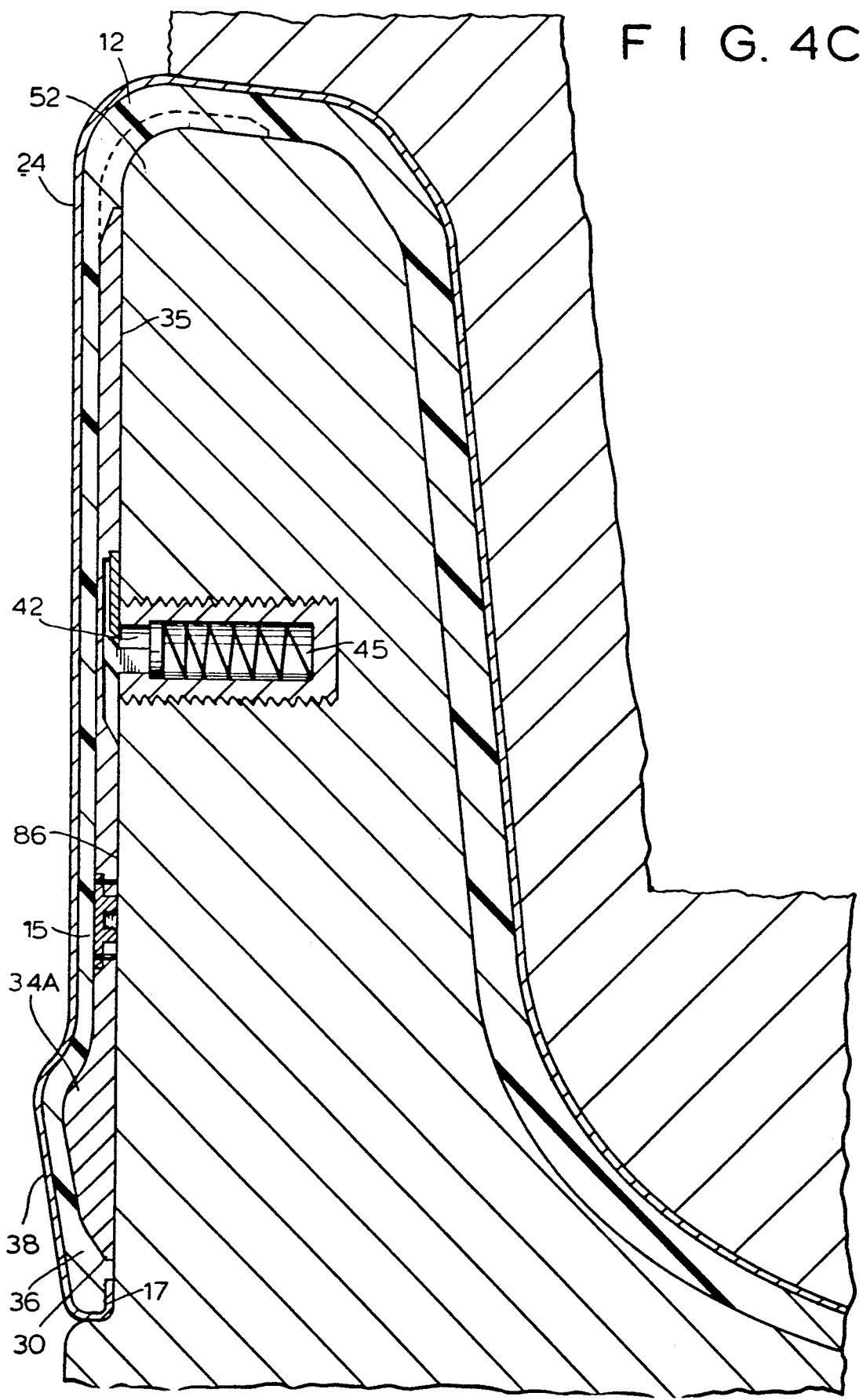

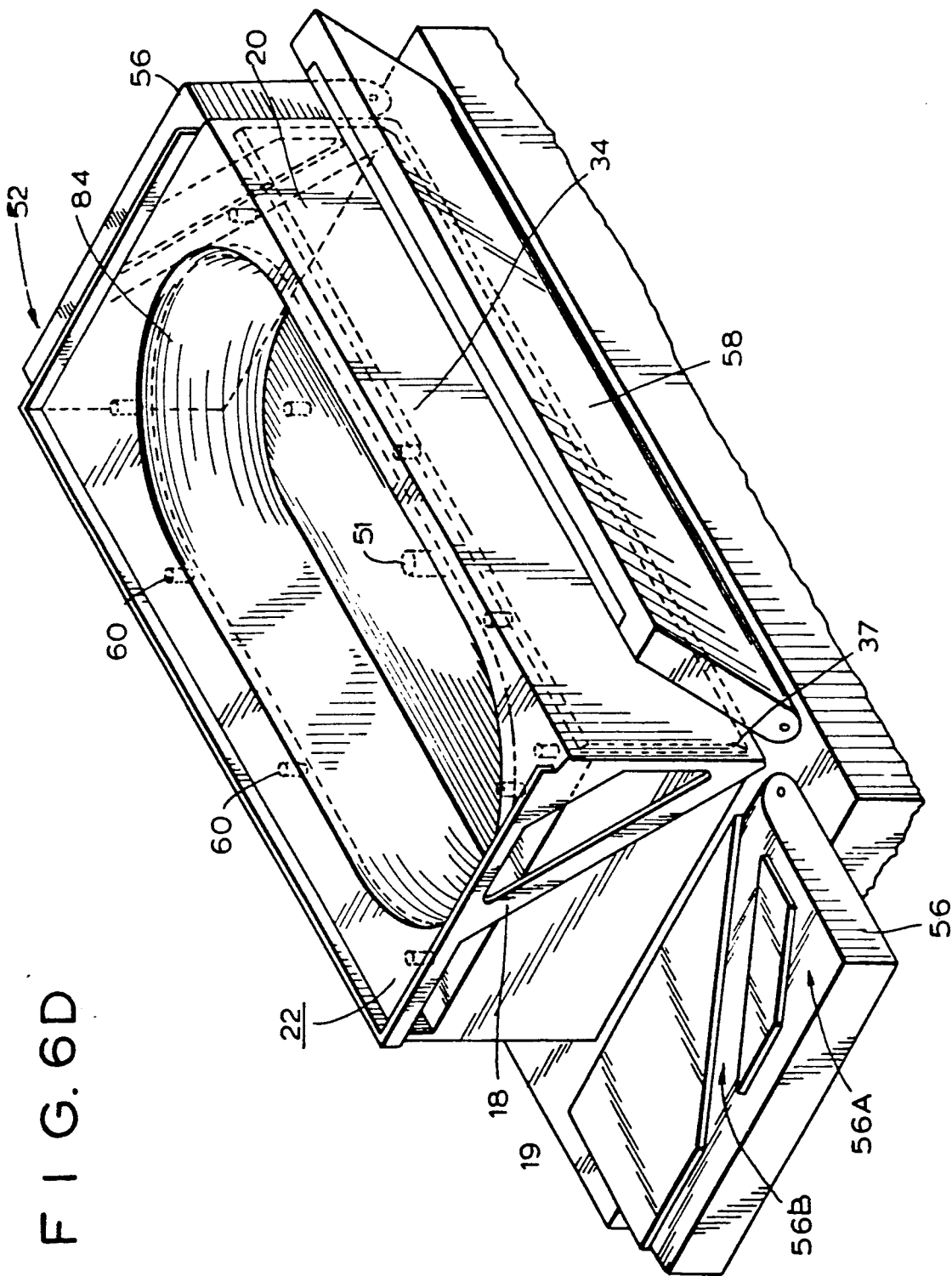

MOLD HAVING AN INSERT FOR MOLDING BATHTUBS

BACKGROUND OF THE INVENTION

1. Field of the Invention

The present invention relates to molded articles and a process for molding the same involving the use of an insert attached to a mold.

2. Background of the Related Art

In the development of bathtubs, porcelain-cast iron fixtures have gradually been replaced by lighter and more resilient component structures. One of the difficulties with the porcelain-cast iron and enamelled fixtures has been their susceptibility to impact damage and their extreme weight which makes movement and installation of large fixtures such as bathtubs and whirlpool tubs difficult. The porcelain-cast iron fixtures did have the advantage of having a very solid feel and high weight bearing capability.

Initial attempts by the industry to replace these porcelain-cast iron fixtures proved difficult. The thin stainless steel fixtures were lighter than the porcelain-cast iron fixtures but did not have the solid feel or structural strength required for large articles such as bathtubs and whirlpool tubs. The early composite structures have a plastic, hollow feel and would deform, crack, chip or de-laminate when subjected to impact, thermal shock or the weight of the typical bather. Additionally, their production required the use of a large amount of polymeric material which increased the weight of a tub and increased the cost of manufacture. Furthermore, certain polymeric materials or resins shrink upon curing. This resulted in bowing, warpage and distortion of the tubs.

Reinforced grids have been used to add strength and rigidity to the surface of bathtubs. For example, U.S. Pat. No. 2,820,228 describes the reinforcement of a bathtub by a gridwork secured to the bottom of the tub. The gridwork may also extend to the sides of the tub in order to deaden vibrations in the sides of the tub. Although the gridwork adds strength, it also adds weight and requires additional steps in the manufacturing process.

Various references have been described for creating a cavity in a molded article. For example, U.S. Pat. Nos. 3,610,563, 3,674,394 and 3,368,239 describe methods for forming articles, such as tanks and molded hollow articles. During the molding operation, a balloon or tube expands resulting in the production of a hollow article. None of these patents however relate to the formation of composite baths or whirlpools, but rather describe the formation of a cavity for the purpose of creating a hollow object, such as a tank.

German Patent DT 2951091 teaches the formation of a plastic bathtub which has parallel tubes extending the length of the flange which tubes may be filled with foam or other materials. The purpose of the tubes is to add rigidity to the tub and reinforce the structure, taking the place of heavy steel rods which were formerly used to reinforce the tub. The tubes are only useful in areas having a large cross-section, and may be difficult to insert during the molding process.

Commonly assigned U.S. Pat. No. 4,664,092 to Genovese et al. and U.S. Pat. No. 4,923,260 to Kuszaj et al., both of which are incorporated by reference herein, describe polymeric foam backed enameled-carbon steel or stainless steel plumbing fixtures that are resistant to chipping, cracking, crazing, de-lamination or deformation when subjected to impact from either the finish or non-finish side. The use of the aforementioned composite molded structures results in fixtures which have the feel of porcelain-cast iron and enamel fixtures, high impact strength, and resistance to delamination. These composite structures possess excellent physical and mechanical properties as a result of the chemical bonding of the reinforced foamed polymeric layer to the enameled steel or stainless steel shell. A problem with such fixtures, however, is that a large amount of polymeric material is used in certain portions of the tubs, resulting in increased weight and increased costs. In addition, in the portions having increased cross-sectional areas of polymeric material, the fixtures still suffer problems due to distortion, bow and warpage from the shrinkage of the polymeric material as it cures. They also suffer distortion, bow and warpage in these thicker portions due to the inability of the polymeric material to release heat and gas produced during the curing process.

Another approach was to replace the enamelled-steel shell with a polymeric-cosmetic surface layer and binding that layer directly to a foamed plastic substrate to provide a high impact strength, delamination-resistant structure. This approach is disclosed in commonly assigned U.S. Pat. Nos. 4,844,944 and 4,844,955, both to Graefe et al., the disclosures of which are incorporated by reference herein. These approaches suffer from the same problems described above with regard to U.S. Pat. No. 4,664,092 and U.S. Pat. No. 4,923,260.

Accordingly, none of the related art describes a method for molding fixtures which allows for the reduction of weight and/or thickness of a portion of the molded fixture while alleviating the problems of distortion, bowing and warpage which existed in the prior molding techniques.

It is therefore an object of the present invention to provide a lightweight composite plumbing fixture such as a bathtub which does not suffer the warpage, bowing and distortion problems associated with the shrinkage of polymeric material.

It is also an object of the present invention to provide a mold for making a plumbing fixture such as a bathtub which does not suffer the warpage, bow and distortion problems associated with the shrinkage of polymeric materials in areas having a relatively large cross section.

SUMMARY OF THE INVENTION

These and other objects are achieved by the present invention which provides a method for molding articles, such as bathtubs and whirlpool tubs. An apron insert is removably attached to a front mold receptor face. A bathtub shell which has been suitably primed on its non-finish side is placed in the mold receptor leaving a void between the mold receptor face and the non-finish side of the bathtub shell. The apron of the shell is positioned parallel to the front mold receptor face and attaches to the apron insert leaving a void for introducing a hardenable polymeric foam. The shell is sealably retained to the mold receptor by lowering a male mold closing means which engages the finish side of the bathtub shell including the shell reservoir and shell deck. Two side doors are closed to form sealed molding channels about a small brace and a large brace of the bathtub shell. The front apron door sealably engages the finish side of the apron and seals to the rim of the male mold closing means and to the side doors, thus forming a sealed continuous injection molding cavity for the introduction of the hardenable polymeric foam. The polymeric foam is introduced under pressure through an aperture in the mold receptor and fills the molding cavity. It is preferred to maintain the temperature of the hardenable polymeric foam in the range of about 85° to 105° F., preferably at about 95° F. The mold receptor and insert are suitably made from a good heat conducting material, preferably a metal such as aluminum. The temperature of the mold receptor is preferably regulated at the preferred temperature range. The mold receptor and apron insert suitably may be coated with a non-stick material, such as Teflon which does not compromise their heat conducting characteristics. After the molded polymeric foam has sufficiently hardened, the apron door and the side doors are opened and the male mold closing member is retracted. The molded bathtub is lifted partially out of the mold receptor by ejectors. The ejectors force the molded bathtub and apron insert upwards, causing a chamfered surface in a recess of the attachment face of the apron insert to force spring biased protrusions into an opening in the front mold receptor face. After the molded bathtub and apron insert are removed from the mold receptor, an insert removal tool is attached to the threaded aperture in the attachment face of the apron insert. The insert removal tool has a lever arm and a threaded protrusion which is rotatably inserted into the threaded aperture, and a suitable force is applied to the lever arm to pop the apron insert out of the hardened polymeric foam.

The molded article of the present invention preferably includes a bathtub or whirlpool tub which has a deck surrounding a reservoir. A layer of polymeric foam is molded to a non-finish side of the bathtub shell. The molded bathtub also includes an apron which extends downwardly from one side of the deck until it terminates at an inwardly curved shell lip. Suitably, the apron is supported by two braces, a small inner brace, and a larger outer brace on both the front and rear ends of the bathtub which extend diagonally upwards from the ends of the apron to the front and rear of the deck. In an alternative embodiment a web of polymeric material extends between the middle of the reservoir and the middle of the apron. The polymeric foam material on the non-finish side of the apron includes a rectangular area of reduced thickness covering most of the surface of apron. The area of reduced thickness is surrounded on each side of its periphery by a lip having a chamfer of approximately 45°. The bathtub shell has an interior finish side and an exterior non-finish side. Preferably the apron of the shell includes an inwardly bowed region near the bottom of the apron. The bathtub shell is preferably constructed from steel which has been coated with an enamel on both its finish side and non-finish side. In another preferred embodiment the bathtub shell may be steel which has not been coated with enamel on its non-finish side, or the bathtub shell may be constructed from stainless steel. Alternatively the bathtub shell may be constructed of a polymeric, fiberglass and-/or composite materials. In an alternative preferred embodiment, the molded bathtub of the present invention, the area of reduced thickness is altered to follow the contour of the apron near the bowed region forming a deeper contoured lip which is contiguous with the portion of the chamfered lip at the bottom of the area of reduced thickness. In another alternate embodiment, the molded bathtub includes an area of reduced thickness in the polymeric foam which extends upwardly past the apron and curves at about a 90° angle to follow the contour of the deck. The area of reduced thickness which parallels the deck, is preferably about one-half (½) as thick as the area surrounding it. The chamfered lip surrounds the periphery of the area of reduced thickness which extends under the deck.

The bathtub of the present invention is made utilizing a mold press. The mold press includes a platform onto which a mold receptor is mounted. The mold receptor is adapted for receiving a bathtub shell, leaving a void between the non-finish side of the shell and the mold receptor face. A male mold closing member fits into the bathtub reservoir and engages the finish side of the bathtub shell deck, sealing the shell to the mold receptor and forming a closed cavity between the mold receptor and the non-finish side of the shell. The male mold closing member is retained against the bathtub shell and the mold receptor during the molding process. The mold receptor includes a mold receptor face for forming a void between the mold receptor and the non-finish side of the bathtub shell apron. The mold receptor also includes a front apron door to sealably engage and hold the apron of the bathtub shell to the mold receptor during the injection molding process. Two side doors are also included each has channels for molding of the polymeric foam surrounding the small brace and the large brace, respectively. The side doors sealably engage and hold the bathtub shell to the mold receptor during the injection molding process. An aperture in the mold receptor communicates with a mix head for introducing the hardenable polymeric foam into the void created between the mold receptor face and the bathtub shell. A plurality of ejectors are positioned in the mold receptor and serve to separate and eject the molded bathtub from the mold receptor after the molding process has been completed. An apron insert is removably attached to the front mold receptor face. The insert is shaped to reduce the cross-sectional area of the void formed between the front mold receptor face and the non-finish side of the apron of the shell. The insert is bevelled around its periphery at an angle of about 45° tapering outwardly. The bathtub shell is placed within the mold receptor with the apron positioned along the front mold receptor face and apron insert. In an alternative embodiment, the apron insert includes an aperture which communicates with a corresponding aperture in the mold receptor for molding a polymeric foam web. A recess in the attachment face of the apron insert receives a protrusion which extends from the front mold receptor face. Protrusion is controllably biased for extension from or retraction into the front mold receptor face. In the preferred embodiment, the protrusion is angled at an acute angle of about 45° from the front mold receptor face, upwards (i.e., away from the direction of gravity). The protrusion extends from an opening in the front of mold receptor face and includes a plunger face which is forced outwardly by a spring until it meets the rim of the opening. A recess in the attachment face has a lower chamfered surface which matches the angle of the protrusion. The apron insert, molded polymeric foam and shell lip present a smooth flat surface to the front mold receptor face allowing the molded bathtub and apron insert to smoothly slide upwardly out of the mold receptor. There are two alternate embodiments of the apron insert. A preferred alternate apron insert has a contoured region for forming a contoured lip. The contoured region forms an area of reduced thickness that follows the contour of the apron and does not leave a region of increased thickness near the bowed region of the apron. Another alternative embodiment of the insert includes an upper portion forming an area of reduced thickness under the deck. The upper portion of this alternative insert rests on top of the mold receptor which is positioned adjacent to the front mold receptor face and under the deck of the shell.

For a better understanding of the present invention, reference is made to the following description, taken in conjunction with the following figures, the scope of which is pointed out in the appended claims.

BRIEF DESCRIPTION OF THE DRAWINGS

FIG. 1B is a side elevational view of the bathtub illustrated in FIG. 1A.

FIG. 1D is a rear elevational view of the bathtub illustrated in FIG. 1A.

FIG. 2C is a rear elevation view of the bathtub shell illustrated in FIG. 2A.

FIG. 3A is an enlarged fragmentary view of the apron portion of the bathtub made in accordance with the present invention illustrated in FIG. 1C.

FIG. 3B is the same view as FIG. 3A illustrating a bathtub which was molded without the insert of the present invention.

FIG. 3C is the sam view as FIG. 3A illustrating an alternative preferred embodiment of the present invention.

FIG. 3D is the same view as FIG. 3A, illustrating still another alternative embodiment of the present invention

FIG. 4C is the same view as FIG. 4A illustrating the alternative preferred embodiment of FIG. 3C and the other alternative embodiment of FIG. 3D (shown in phantom).

FIG. 6D shows the mold receptor and apron insert illustrated in FIG. 6C with a shell in place.

DETAILED DESCRIPTION OF THE PREFERRED EMBODIMENTS

Figure 1A:
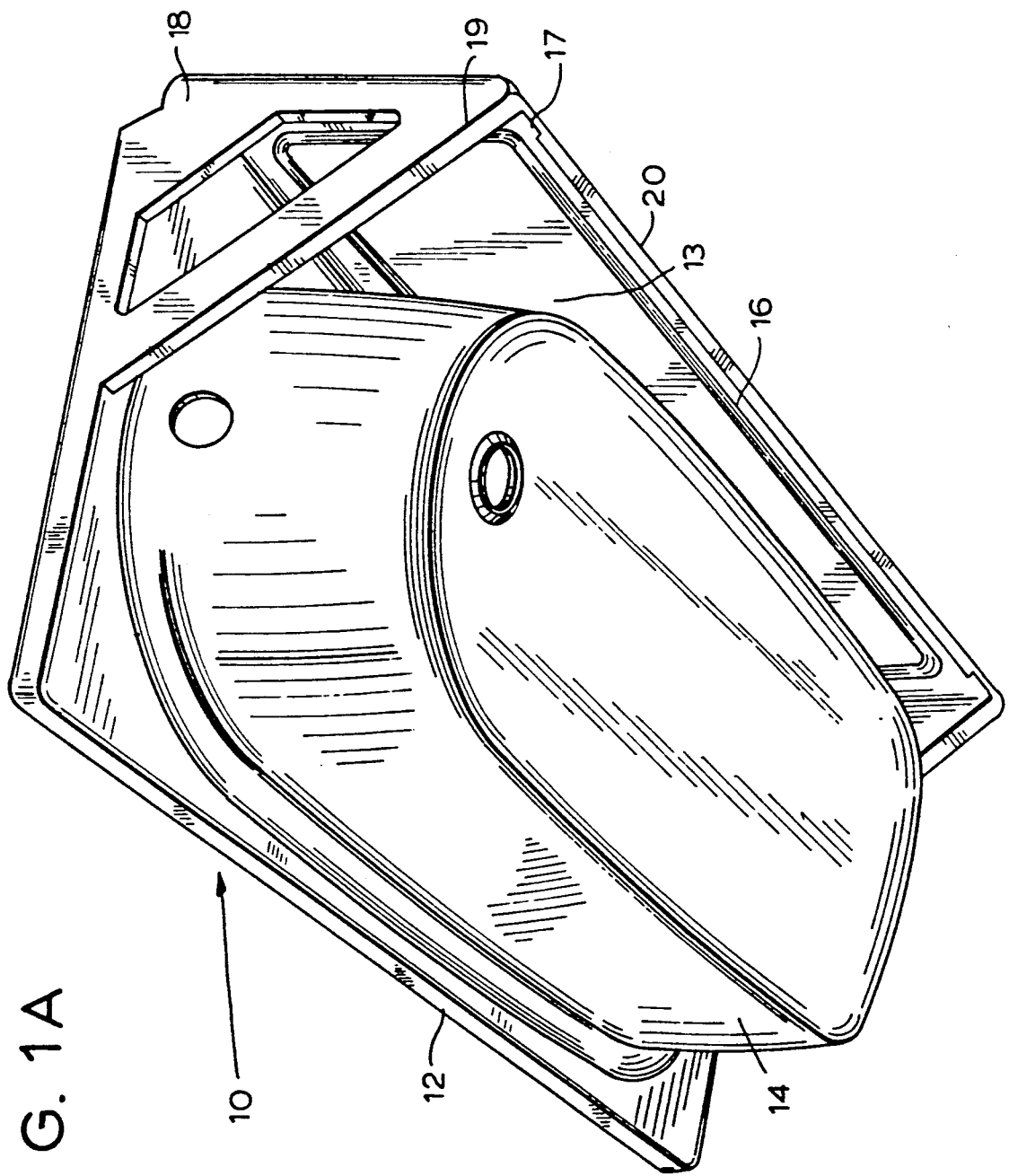
FIG. 1A is a bottom perspective view of a bathtub made according to the present invention showing the polymeric molded non-finish side.

A molded bathtub 10 made in accordance with the present invention is shown in FIGS. 1A, 1B, 1C and 1D. The molded bathtub 10 has a deck 12 surrounding a reservoir 14, and polymeric foam 15 molded to a non-finish side 26 of the bathtub shell 22 illustrated in more detail in FIGS. 2A and 2B. The molded bathtub 10 also includes an apron 20. Apron 20 extends downwardly from one side of the deck 12 until it terminates at an inwardly curved shell lip 17. In the embodiment illustrated, the shell lip 17 terminates the apron 20 at about the lowest level of the outside of the reservoir 14, however, in an alternative embodiment (not shown) the apron 20 may terminate either above or below the level of the bottom of reservoir 14. The apron 20 is supported by two braces, a small inner brace 18, and a larger outer brace 19 on both the front and rear of the bathtub 10. which extend diagonally upwards from the ends of the apron 20 to the front and rear of the deck 12. In an alternative embodiment a web of polymeric material 21 extends between the middle of the reservoir and the middle of the apron, (shown in phantom in FIG. 1C) to further support apron 20. The polymeric foam material 15 on the non finish side 26 of apron 20 includes a rectangular area of reduced thickness 13 covering most of the surface of apron 20. The area of reduced thickness 13 is surrounded on each side of its periphery by a lip 16 having a chamfer of approximately 45°.

The molded bathtub 10 can of course be adapted to form a whirlpool tub by the drilling of appropriately placed holes in the reservoir 14. The molded bathtub 10 is made by molding the polymeric foam 15 onto the non finish side 26 of bathtub shell 22. Bathtub shell 22 is illustrated in detail in FIGS. 2A, 2B, and 2C. Bathtub shell 22 has an interior finish side 24 and an exterior non-finish side 26. The non-finish side 26 is not ordinarily exposed to view after illustration, while the finish side 24 is normally seen and contacted by the user after the bathtub has been installed. Preferably the apron 26 of shell 22 includes an inwardly bound region 28 at the bottom of apron 20 a few inches above shell lip 17.

Bathtub shell 22 is preferably constructed from steel which has been coated with an enamel on both its finish side 24 and non-finish side 26, as disclosed in commonly assigned U.S. Pat. No. 4,664,982 to Genovese et al., the disclosure of which is incorporated by reference herein. In another preferred embodiment the bathtub shell 22 may be steel which has not been coated with enamel on its non-finish side 26, or the bathtub shell 22, may be constructed from stainless steel as disclosed in commonly assigned U.S. patent application Ser. No. 07/400,289 to Kuszaj et al., the disclosure of which is incorporated by reference herein. Alternatively bathtub shell 22 may be constructed of a polymeric, fiberglass and/or the composite materials as disclosed in commonly assigned U.S. Pat. No. 4,844,944 and 4,844,955 to Graefe et al., the disclosures of which are incorporated by reference herein. Likewise, the respective polymeric foam 15 and primer suitable for each of the respective bathtub shell 22 constructions is also described in detail in the aforementioned U.S. Pat. Nos. 4,664,982, 4,844,944 and 4,844,955, as well as in U.S. application Ser. No. 07/400,289 all of which have been incorporated by reference herein. The term polymeric foam 15 and "hardenable material" include all material suitable for making the molded articles contemplated by the present invention.

Figure 1C:
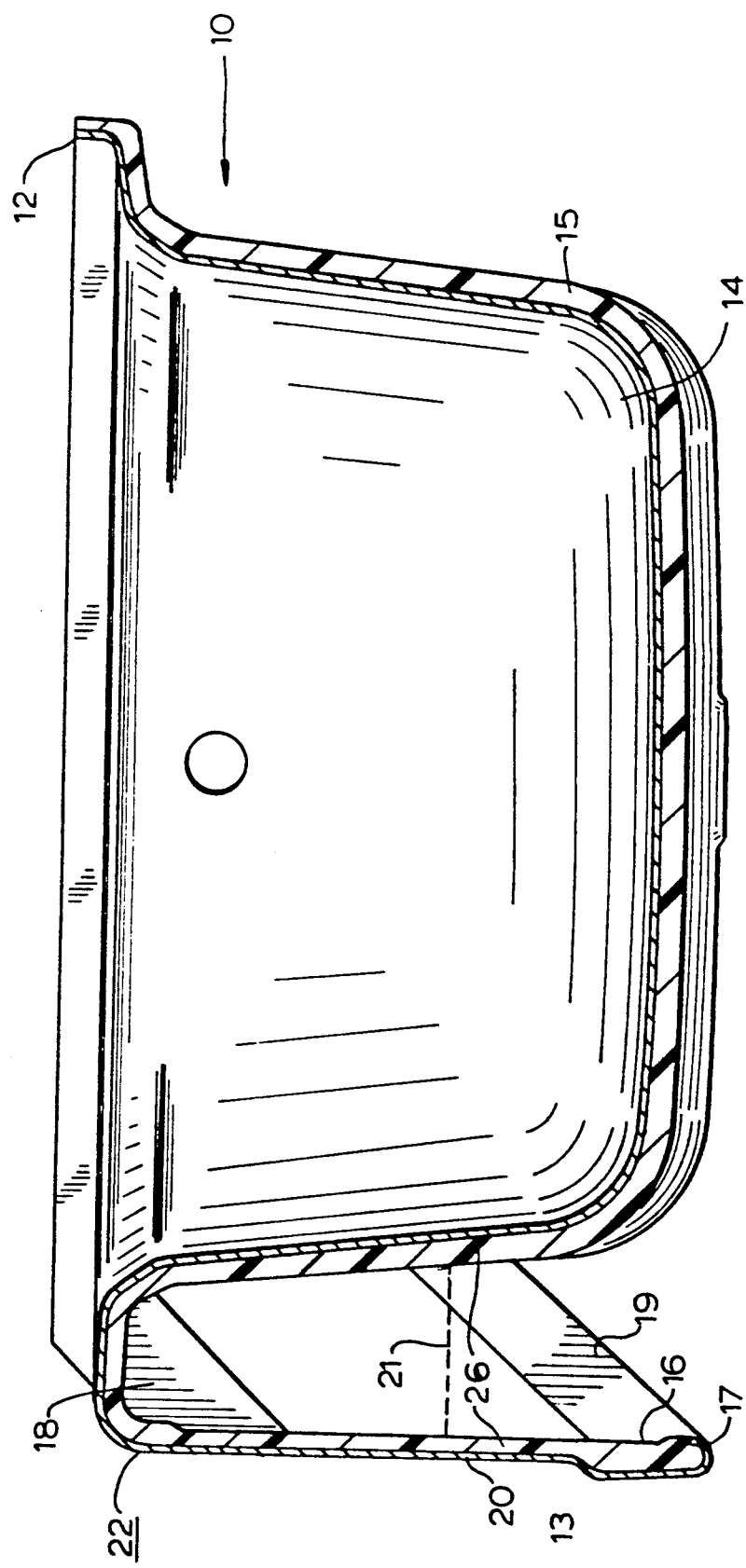
FIG. 1C is an enlarged vertical cross-sectional view of the bathtub illustrated in FIG. 1B shown in the direction of the arrows.
Figure 2A:
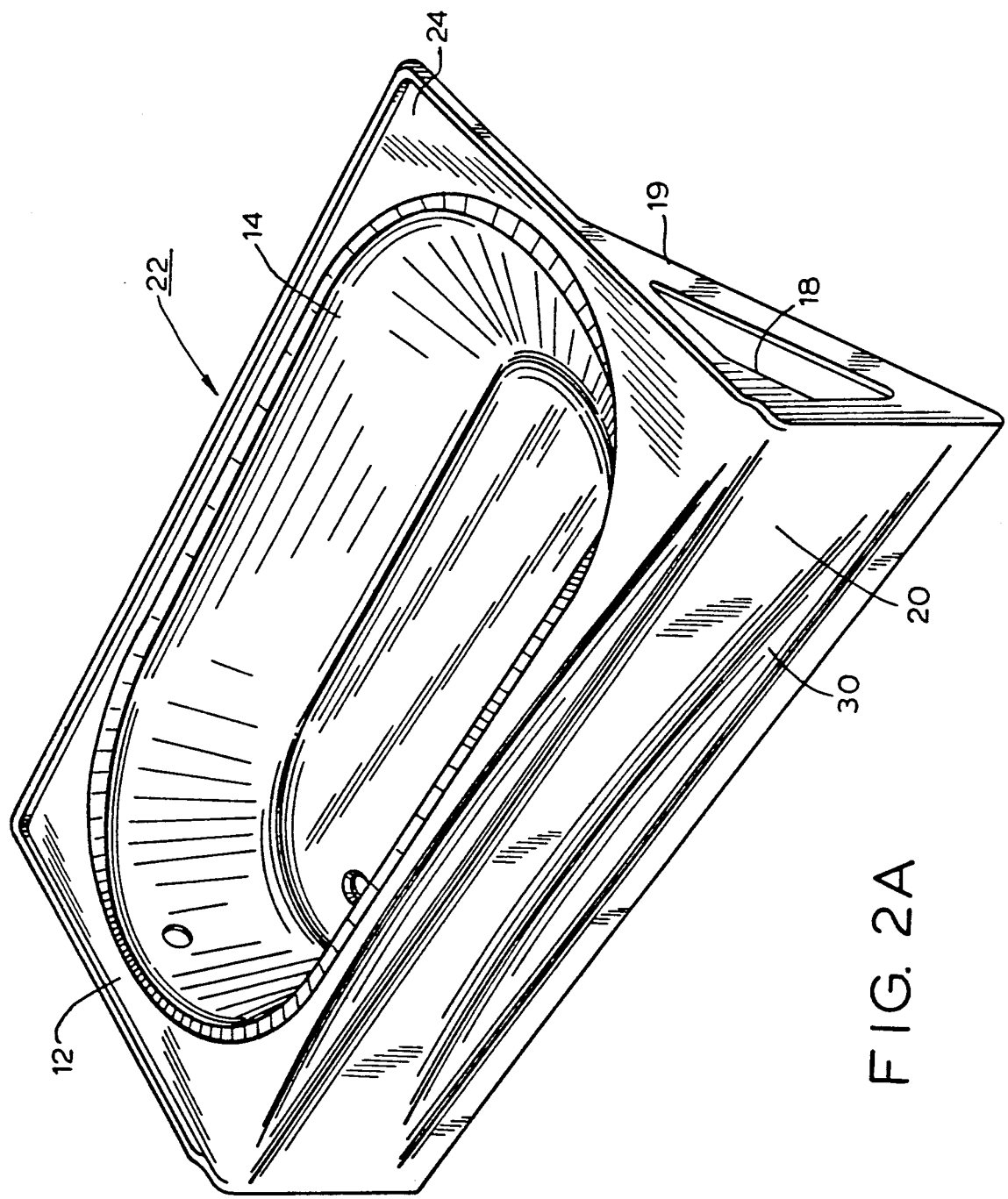
FIG. 2A is a top perspective view of a bathtub shell used with the present invention showing the finish side.
Figure 2B:
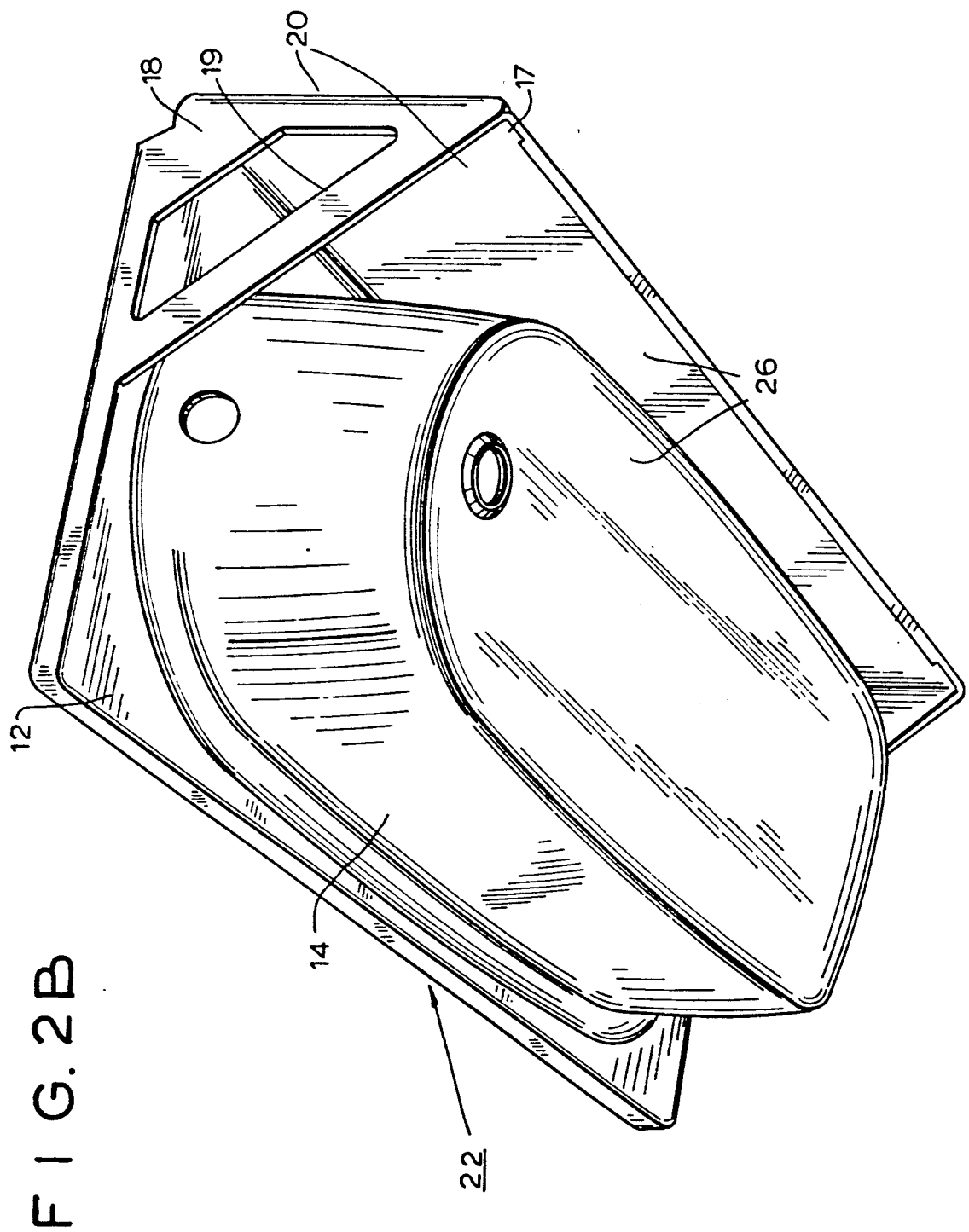
FIG. 2B is a bottom perspective view of the bathtub shell illustrated in FIG. 2A having the non-finish side.

FIG. 3A is an enlarged fragmentary view showing the details of a vertical cross-section through the apron 20 portion of the molded bathtub 10 as illustrated in FIG. 1C (the optional web 21 showing in phantom in FIG. 1C is not shown). FIG. 3B is shown for the sake of comparison illustrating the excess polymeric foam material 15 molded to the apron 20 in the absence of the present invention. FIG. 3D illustrates an alternative preferred embodiment of the molded bathtub 10 of the present invention, which is similar that shown in FIG. 1A-1D and FIG. 3A, except that the area of reduced thickness 13 is altered to follow the contour of the apron 20 near the bowed region 28 forming a deeper contoured lip 30 which is contiguous with the portion of the chamfered lip 16 at the bottom of the area of reduced thickness 13. In another alternate embodiment of molded bathtubs 10, illustrated in FIG. 3D the area of reduced thickness 13 in the polymeric foam 15 extends upwardly past the apron 20 and curves at about a 90° angle to follow the contour of the deck 12. The area of reduced thickness which parallels the deck 12, designated 32, is preferably about one-half (½) or less as thick as that portion of the insert which lies parallel to the apron 20. As in the embodiment illustrated in FIG. 3C, the chamfered lip 16 surrounds the periphery of the area of reduced thickness 13 which extends under the deck 12.

Figure 6A:
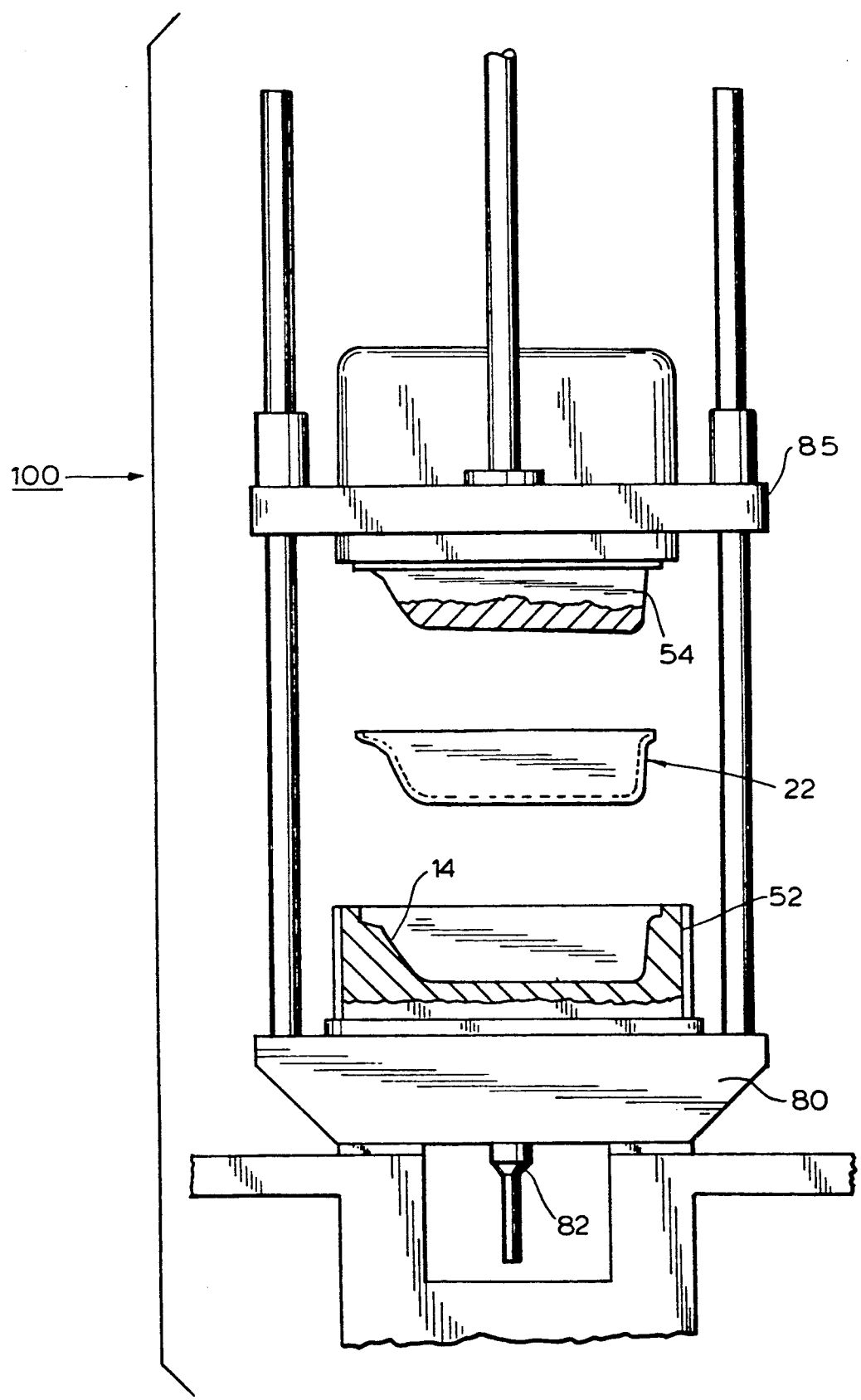
FIG. 6A is a schematic front elevational view of a bathtub molding apparatus in accordance with the present invention.

The bathtub of the present invention is made utilizing a mold press 100 illustrated in FIG. 6A. Mold press 100 includes a platform 80 onto which a mold receptor 52 is mounted. A mix head 82 is positioned below platform 80 for injecting the polymeric foam 15 through a conduit in platform 80 and into the mold receptor 52. Mold receptor 52 is adapted for receiving bathtub shell 22 leaving a void between the non-finish side 26 of the shell 22 and the mold receptor face 84.

Figure 6B:
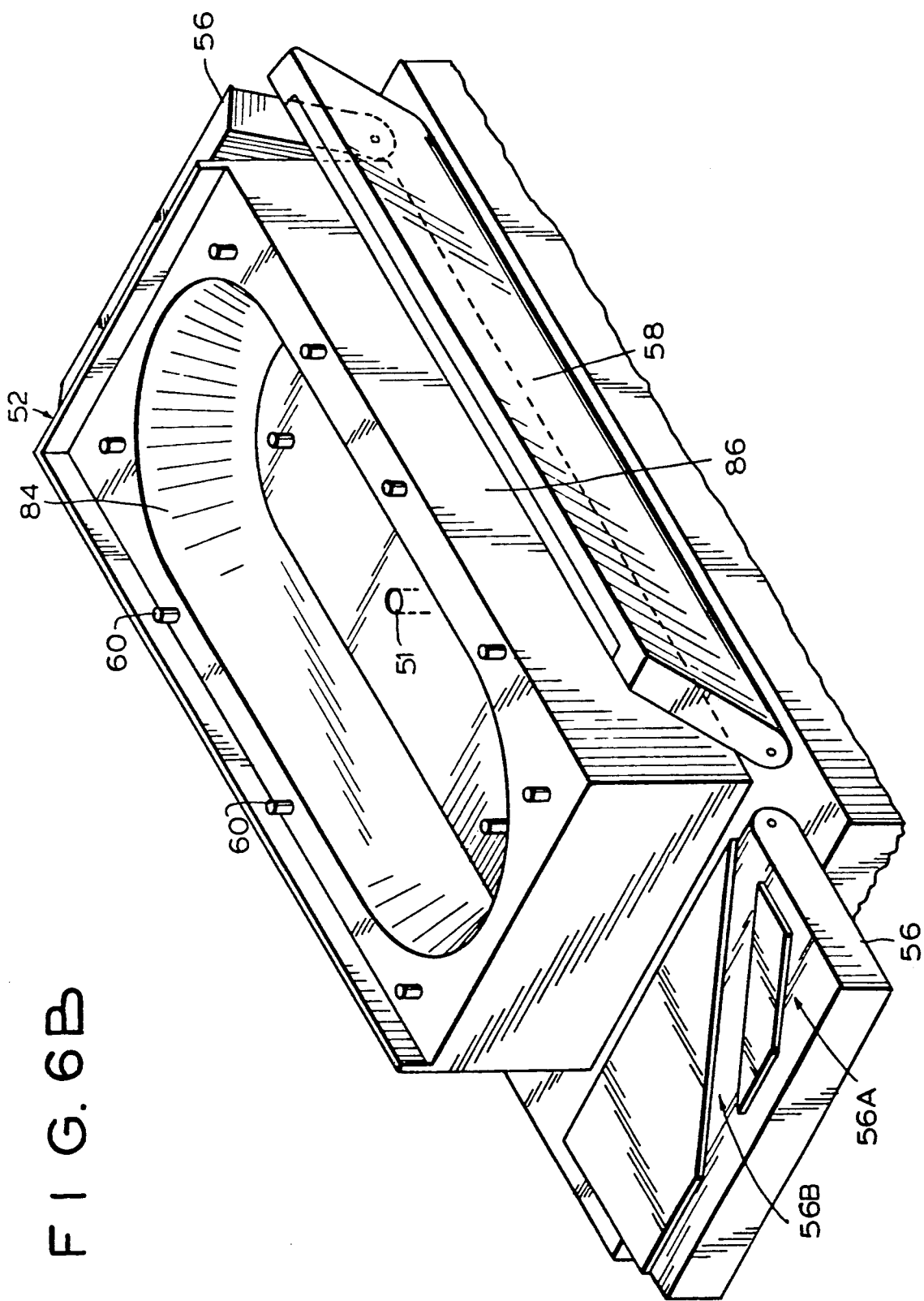
FIG. 6B is a top perspective view of a preferred mold receptor.
Figure 6C:
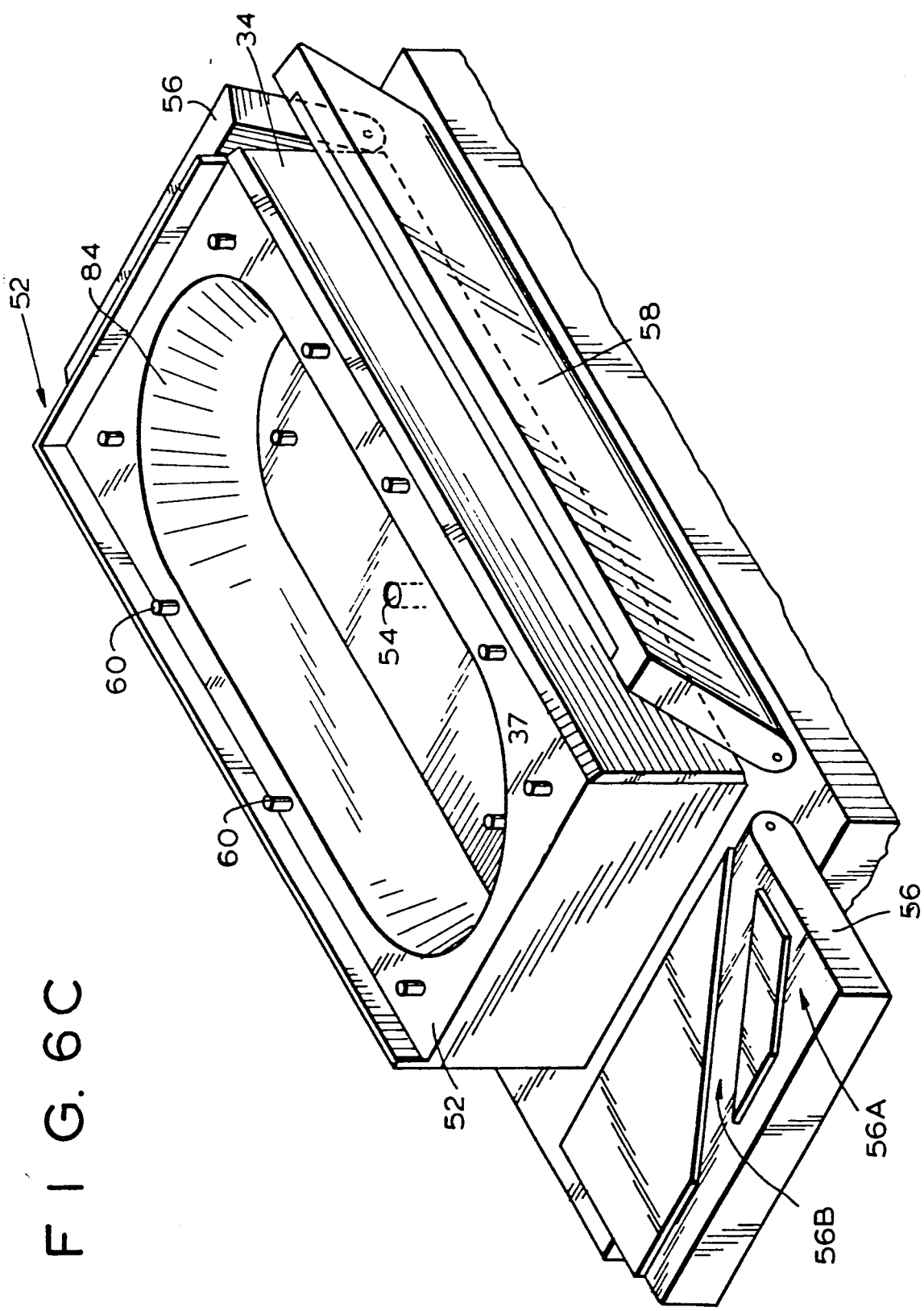
FIG. 6C shows the mold receptor of 6B with an apron insert mounted in place.

A male mold closing member 54 has a rubbery elastomeric surface which snugly fits into the bathtub reservoir 14 and deck 12 on the finish side 24 of the bathtub shell 22, sealing the shell 22 to mold receptor 52 and forming a closed cavity between the mold receptor face 84 and the shell's non-finish side 26. The male mold closing member 54 also helps to minimize warp, bowing and distortion of the bathtub shell during the injection molding process. A hydraulically operated system 85 lowers and retains the male mold closing member 54 against the bathtub shell 22 and mold receptor 52 during the molding process. A mold press 100 which is suitable for molding bathtubs including the present invention is manufactured by Linden Industries, Inc. As illustrated in FIGS. 6B-6D, the mold receptor 52 includes a mold receptor face 86 for forming a void between it and the non-finish side 24 of the bathtub shell apron 20. The mold receptor 52 also includes a front apron door which is covered with an elastomeric material to sealably engage and hold the apron 20 of the bathtub shell to the mold receptor 52 during the injection molding process. Two side doors 56 are covered with elastomeric material, as in the apron door 58, each side door includes channels 56A and 56B for molding of the polymeric foam surrounding the small brace 18 and large brace 19, respectively. As with the apron door 58, side doors 59 sealably engage and hold the bathtub shell to mold receptor 52 during the injection molding process.

An aperture 51 in mold receptor 52 communicates with the mix head for introducing the hardenable polymeric foam into the void created between the mold receptor face 84 and the bathtub shell 22. A plurality of ejectors 60 are positioned in the mold receptor 52 which serve to separate and eject the molded bathtub 10 from the mold receptor 52 after the molding process has been completed. Preferably, the ejectors are cylindrical rods which are hydraulically activated, from a recessed position to an ejected position (shown in FIG. 6B) and vice versa.

As shown in FIG. 6C, an apron insert 34 is removably attached to the front mold receptor face 86. The insert 34 is shaped to reduce the cross-sectional area of the void formed between the front mold receptor face 86 and the non-finish side 26 of the apron 20 of shell 22. The insert 34 is bevelled around its periphery 16 at an angle of about 45°. As illustrated in FIG. 6D, the bathtub shell 22 is placed within the mold receptor 52 with the apron 20 positioned along the front mold receptor face 86 and apron insert 34 (shown in phantom).

Figure 5A:
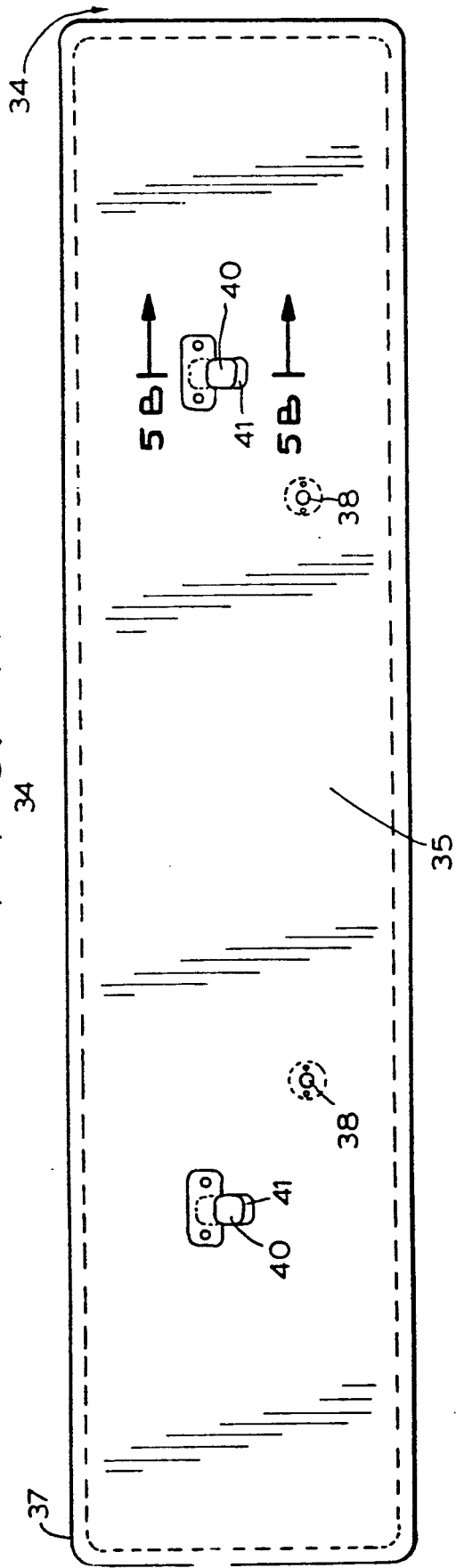
FIG. 5A is a rear elevational view of the present invention illustrating the side which contacts the mold receptor face.
Figure 5B:
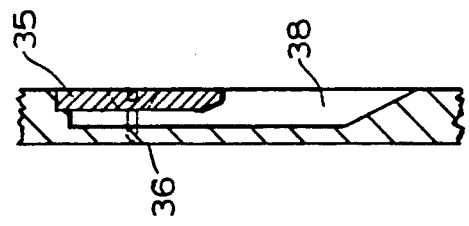
FIG. 5B is an enlarged vertical cross-sectional view illustrating a recess for mounting the insert, shown in the direction of the arrows.
Figure 5C:
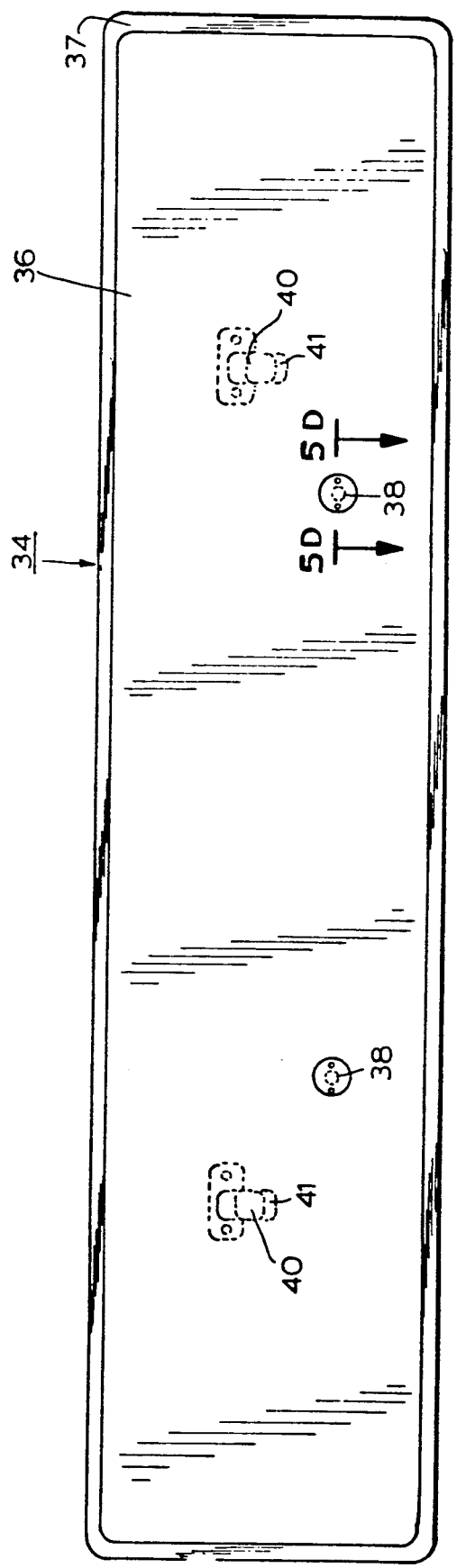
FIG. 5C is a front elevational view of the apron insert shown in 5A, illustrating the side which faces towards the apron of the bathtub shell.
Figure 5D:
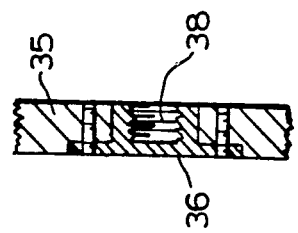
FIG. 5D is an enlarged vertical cross-sectional view of a threaded aperture for removing the insert, shown in the direction of the arrows.
Figure 5E:
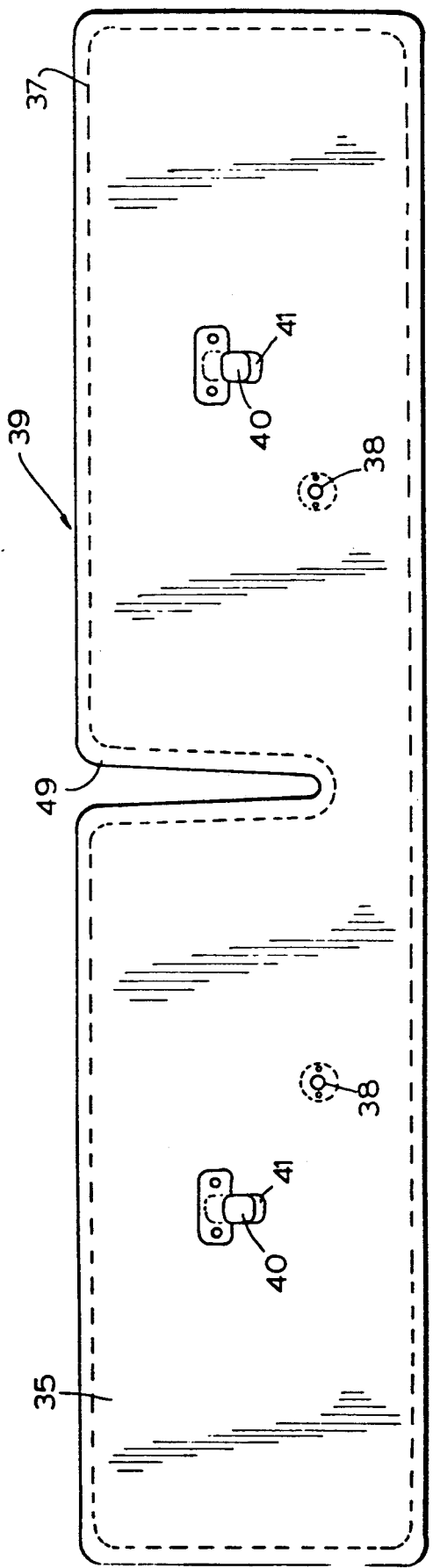
FIG. 5E is the same view as FIG. 5A of an alternative apron insert having a slot for forming a web.

The preferred apron insert is illustrated in FIGS. 5A-5D. FIG. 5A shows the attachment face 35 of the apron insert 34 which contacts the front mold receptor face 86. The smaller, opposite molding face which faces toward the apron 20 is shown in FIG. 5C. In an alternative embodiment another apron insert 39 includes an aperture 49 which communicates with a corresponding aperture in the mold receptor 52 for molding a polymeric foam web 21 described, supra (shown in phantom in FIG. 1C). The periphery of apron insert 34 is bevelled at approximately a 45° angle on the side of the molding face 36. The apron insert 34 may be attached to the front mold receptor face 86 by any convenient means, including mechanical, hydraulic, suction or magnetic attachment means. A preferred mechanical attachment includes a recess 40 in the attachment face 35 for receiving a protrusion, as illustrated in FIG. 5A, and in the enlarged vertical cross-sectional view in FIG. 5B.

Figure 7A:
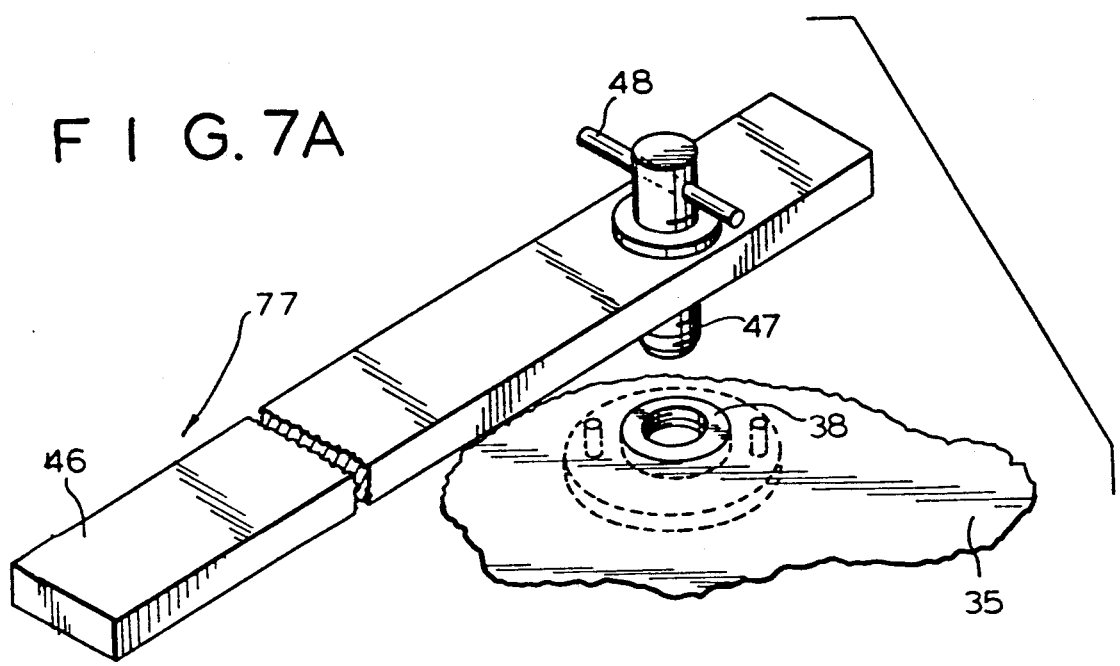
FIG. 7A is an assembly view of an insert removal tool and threaded aperture of the apron insert in accordance with the present invention.
Figure 7B:
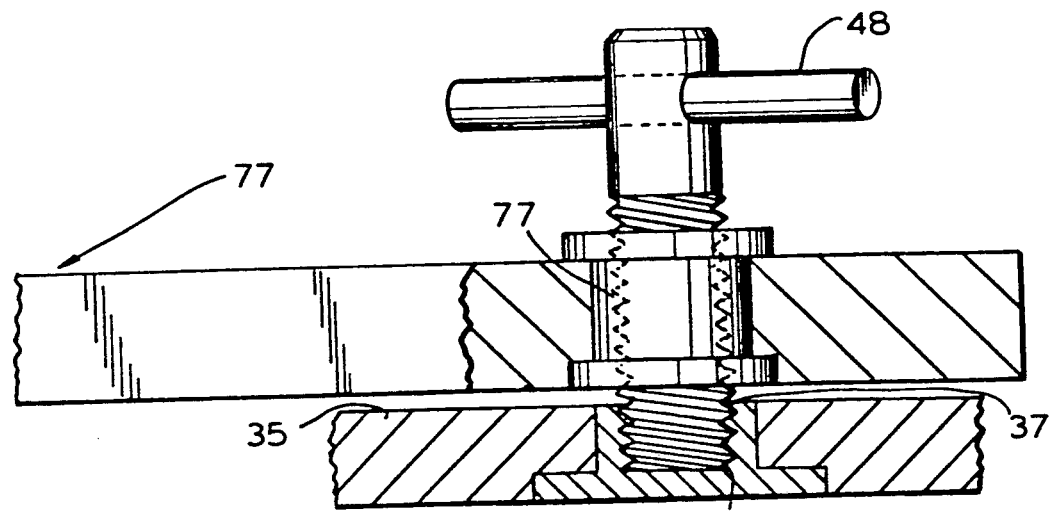
FIG. 7B is a partial breakaway view illustrating the insert removal tool threadably engaged to the threaded aperture of the apron insert illustrated in FIG. 7A.

After the molded bathtub has been removed from the mold receptor 52, the apron insert is removed from the hardened polymeric foam 15 and the apron 20 by using a removal tool which attaches to a threaded aperture 38 in the attachment face 35 of the apron insert 34, which is illustrated in FIGS. 5A, 7A and 7B.

Figures 4A, 4B:
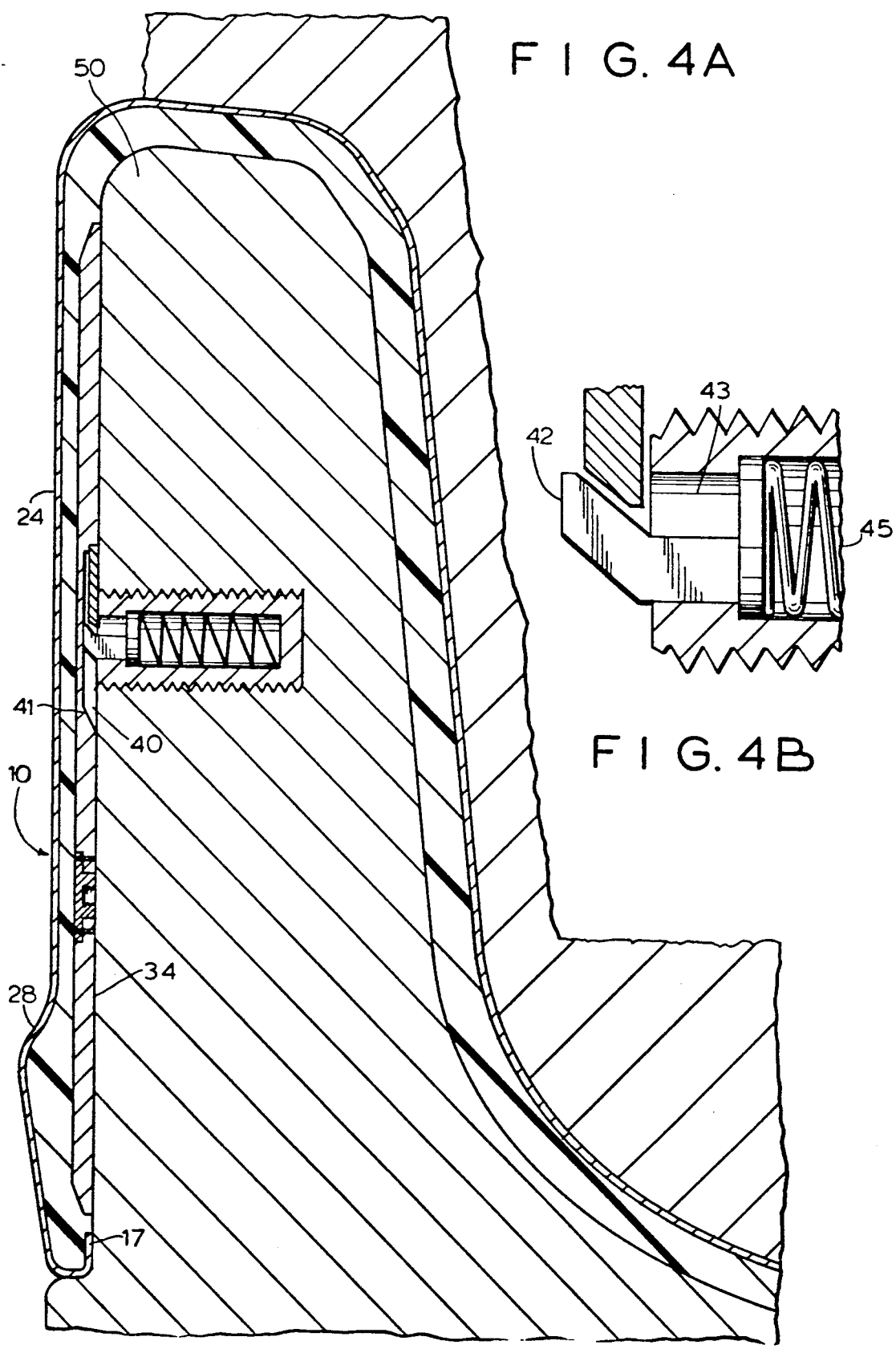
FIG. 4A is a fragmentary cross-sectional view showing the apron portion of the bathtub illustrated in FIG. 3A in a mold of the present invention.
FIG. 4B is an enlarged fragmentary view of a spring plunger mechanism for attaching an apron insert to a mold receptor face illustrated in FIG. 4A.

The apron insert 34 is removably attached to the front mold receptor face 86 of mold receptor 52. As illustrated in FIGS. 4A and 4B, recess 40 in attachment face 35 of the apron insert receives a protrusion 42 extending from the front mold receptor face 86. Protrusion 42 is controllably biased for extension from or retraction into the front mold receptor face 86. The controlled biasing of protrusion 42 may be by electromechanical, mechanical, hydraulic or other means. In the preferred embodiment illustrated in FIGS. 4A and 4B, the protrusion is angled at an acute angle of about 45° from the front mold receptor face 86, upwards (i.e., away from the direction of gravity). The protrusion 42 extends from an opening in front of mold receptor face 86 and includes a plunger face 44 which is forced outwardly by spring 45 until it meets rim 46 of opening 43. Recess 40 in the attachment face 35 has a lower chamfered surface 41 which matches the angle of the protrusion 42. After the molded polymeric foam 15 has sufficiently hardened, the male mold closing member 54 is lifted from the finish side 24 of the molded bathtub 10 and the side doors 56 and front apron door 58 are open. The molded bathtub 10 is then forced vertically upwards by the ejectors 60 partially out of the mold receptor 52. When the molded bathtub 10 is ejected, the chamfered surface 41 of the recess 40 in the attachment face of the apron insert 34 forces the spring biased protrusion 42 into the opening 43 in the front mold receptor face 86, thus releasing the apron insert 34 from the front mold receptor face 86. The apron insert 34, molded polymeric foam 15 and shell lip 17 present a smooth flat surface to the front mold receptor face 86 allowing the molded bathtub 10 and apron insert 34 to smoothly slide upwardly out of the mold receptor 52.

Two alternative embodiments of the apron insert 34 are illustrated in FIG. 4C. The first preferred alternate apron insert 34A has a contoured region for forming the contoured lip 30 illustrated in FIG. 3C. The advantage of this insert is that it forms an area of reduced thickness that follows the contour of the apron 20 and does not leave a region of increased thickness near the bowed region 28 of the apron 20. The other alternative embodiment of the insert 34B, has a lower portion which may be the same as either insert 34 or 34A and also includes an upper portion (shown in phantom) for forming the area of reduced thickness under the deck 12, as illustrated in FIG. 3D. The upper portion of this alternative insert 34B rests on top of the mold receptor 52 which is positioned adjacent to the front mold receptor face 86 and under the deck 12 of shell 22.

After the molded bathtub 10 and attached apron insert 34 is removed from the mold receptor 52 using an insert removal tool 77 having a handle 48 through which a threaded protrusion 46 is rotatably attached, as illustrated in FIG. 7A. The threaded protrusion is threadably engaged into the threaded aperture 38 in the attachment face 35 of the apron insert 34 by rotating handle 48. A force is applied to the lever arm 46 of the insert removal tool 77 to pop the apron insert out of the hardened polymeric foam 15 in the apron 20.

In the process of making the molded bathtub 10, according to the present invention, apron insert 34 is removably attached to the front mold receptor face 86 by inserting protrusion 42 into each recess 40 in the attachment face 35 of the apron insert 34. Prior to molding the mold receptor face 84 and apron insert are spray coated with a suitable mold release agent, preferably a silicone release agent. Additionally, prior to each day of molding, the entire mold surface is waxed. A bathtub shell 22 which has been suitably primed on its non-finish side 26 preferably with a silicone or other suitable molding primer is placed in mold receptor 52 leaving a void between the mold receptor face 84 and the non-finish side 26 of the bathtub shell 22. The apron 20 of shell 22 is positioned parallel to the front mold receptor face 86 and attaches apron insert 34, leaving a void for introducing polymeric foam 15.

The shell 22 is sealably retained to the mold receptor 52 by lowering a male mold closing means 54 which engages the finish side of the bathtub shell 22 including reservoir 14 and deck 12. Two side doors 56 are closed to form sealed molding channels 56A and 56B about small brace 18 and large brace 19 of bathtub shell 22. Front apron door 58 sealably engages the finish side 24 of apron 20 and seals to the rim of male mold closing means 54 and side doors 56 thus forming a sealed continuous injection molding cavity for the introduction of polymeric foam 15.

The hardened polymeric foam 15 is introduced from the mix head 82 through the aperture in the bottom of mold receptor 52 to fill the molding cavity by the hardenable polymeric foam 15 injected under suitable molding pressure. It is preferred to maintain the temperature of the hardenable polymeric foam material 15 in the range of about 85° F. to 105° F., preferably, at about 95° F. The curing of the polymeric foam material 15 is exothermic, so that initially the temperature of the mold receptor 52 must be raised, and later during the curing the mold receptor 52 should be cooled. In order to accomplish this dual task, the mold receptor 52 should be made from a good heat conducting material, preferably a metal such as aluminum. Optionally, the mold receptor face 84 may be coated with a layer of non-stick material, such as a release coating, a wax coating, a silicone coating or a TEFLON coating which does not retard its heat conducting properties. The cooling and heating of the mold receptor 52 is preferably accomplished using a water jacket or other suitable heat reservoir maintained at the preferred temperature range. Since the apron insert 34 contacts a large surface of the polymeric foam 15, preferably, the apron insert 34 is also constructed of a good heat conducting material, such as aluminum. As with the mold receptor face 84, the apron insert 34 may be coated with a layer of non-stick material, such as a release coating, a wax coating, a silicone coating or a TEFLON coating which does not retard its heat conducting properties. This serves to improve the flow of the polymeric foam and helps reduce wet spots, choking and uneven flow of polymeric foam 15 reducing distortion in the apron 20 of the molded bathtub 10.

After the molded polymeric foam 15 has sufficiently hardened, the apron door 58 and the side doors 56 are opened and male mold closing member 54 is retracted. The molded bathtub 10 is lifted partially out of the mold receptor 52 by hydraulic ejectors 60. The ejectors 60 force the molded bathtub 10 and apron insert 34 upwards, causing the chamfered surface 41 in recess 40 of the attachment face 35 of the apron insert to force spring biased protrusions 42 into opening 43 in the front mold receptor face 86. The molded bathtub 10 and apron insert are then manually or mechanically removed from the mold receptor 52.

An insert removal tool 77 is attached to the threaded aperture 38 in the attachment face 35 of the apron insert 34. The insert removal tool 77 has a lever arm 46 and a threaded protrusion 47 which is rotatably inserted into the threaded aperture 38 by means of handle 48, as illustrated in FIGS. 7A and 7B. After attachment of the threaded protrusion 47 into threaded aperture 38, a suitable force is applied to lever arm 46 to pop the apron insert out of the hardened polymeric foam 15.

Thus, while there have been described what are presently contemplated preferred embodiments of the present invention, further changes and modifications could be made by those skilled in the art without departing from the scope of the invention, and it is contemplated to claim all such changes and modifications.

We claim:

1. A mold for manufacturing molded articles comprising:
   (a) a mold receptor for receiving a shell having a finish side and a non-finish side, said receptor having a face for receiving said shell so as to define a void between the non-finish side of said shell and said face of said receptor, said void having an area for introducing a hardenable material, said face having a front mold receptor face;
   (b) an insert which is attached to said front mold receptor face of mold receptor by attachment means, said insert shaped to reduce the cross-sectional area of a portion of said void between said shell and said mold receptor face;
   (c) an apron door having an open position and a closed position, said apron door sealingly engaging the finish side of an apron of said shell opposite said insert when said apron is in the closed position;
   (d) an additional face being positioned approximately normal to said front mold receptor face, said additional face adapted to receive a brace on a side of said shell extending between said apron and a surface of said shell; and
   (e) a door having an open position and a closed position sealably engaging said additional face, said door having a channel for molding hardenable material about said brace when in the closed position.

2. The mold of claim 1, further comprising a mold closing means adapted for removably engaging the finish side of said shell and sealably retaining said shell to said mold receptor.

3. The mold of claim 1, wherein said insert is removably attached to the face of the mold receptor.

4. The mold of claim 1, wherein said insert has an attachment face communicating with said mold receptor face and a molding face on the opposite side of said insert, said insert having a bevelled edge on the periphery of said molding face tapering outwardly towards said mold receptor face.

5. The mold of claim 4, wherein said bevelled edge tapers at an angle of about 45°.

6. The mold of claim 1, wherein said attachment means is selected from the group consisting of mechanical, hydraulic, suction and magnetic attachment means.

7. The mold of claim 6, wherein said attachment means comprises a protrusion extending from said mold receptor face and a recess in said insert for receiving said protrusion.

8. The mold of claim 7, wherein said protrusion is controllably biased for extension from or retraction into said mold receptor face.

9. The mold of claim 8, wherein said protrusion extends at an upward acute angle with respect to the mold receptor face.

10. The mold of claim 9, wherein said acute angle is approximately 45°.

11. The mold of claim 1, wherein said mold receptor includes ejection means for removing the molded article from the mold receptor after completion of the molding process.

12. The mold of claim 1, wherein said insert includes an opening for the passage of said hardenable material which is contiguous with an opening in said mold receptor face.

13. The mold of claim 12, wherein said opening in the insert is approximately at the center of said insert.

14. The mold of claim 1, wherein said mold receptor and said insert are constructed of materials which allow thermal conductivity.

15. The mold of claim 1, wherein said mold receptor and said insert are coated with a non-stick material.

16. The mold of claim 15, wherein said non-stick material is a releasing agent.

17. The mold of claim 1, wherein said insert includes a means for removing said insert from the molded article.

18. The mold of claim 17, wherein said means for removal comprises a threaded aperture in said insert, wherein a removal tool may be attached, said removal tool comprises a threaded protrusion for threadably engaging said aperture in said insert.

19. The mold of claim 18, wherein said removal tool further comprises a lever arm into which said threaded protrusion is rotatably mounted.

20. The mold of claim 15, wherein said non-stick material is selected from the group consisting of a TEFLON coating and a wax coating.

21. The mold of claim 15, wherein said non-stick material is a silicone coating.

* * * * *